United States Patent
Nakamura (10) Patent No.: US 6,470,101 B1
(45) Date of Patent: Oct. 22, 2002

(54) IMAGE READING METHOD (75) Inventor: Hiroaki Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/325,419

(22) Filed: Jun. 4, 1999

(30) Foreign Application Priority Data

Jun. 5, 1998 (JP) .......................................... 10-157233

(51) Int. Cl.[7] ................................................ G06K 9/00
(52) U.S. Cl. ....................................... 382/319; 382/148
(58) Field of Search ................................ 382/318, 319, 382/148, 312; 358/1.2, 505, 474

(56) References Cited

U.S. PATENT DOCUMENTS

| | | | | |
|---|---|---|---|---|
| 4,851,678 A | * | 7/1989 | Adachi et al. ............. | 250/327.2 |
| 4,955,067 A | * | 9/1990 | Shimura ..................... | 382/318 |
| 5,157,482 A | * | 10/1992 | Cosgrove ..................... | 358/54 |
| 5,504,583 A | * | 4/1996 | Jamzadeh et al. .......... | 358/302 |
| 6,009,197 A | * | 12/1999 | Riley .......................... | 382/199 |
| 6,259,825 B1 | * | 7/2001 | Yamazaki .................... | 382/276 |
| 6,323,934 B1 | * | 11/2001 | Enomoto ..................... | 355/40 |

* cited by examiner

Primary Examiner—Yon J. Couso
(74) Attorney, Agent, or Firm—Sughrue Mion, PLLC (57) ABSTRACT

The image reading method scans the film under default reading condition, calculates the minimum density or density distribution information of the film, determines prescan reading condition based on the thus calculated minimum density or density distribution information of the film and then prescans the film under the thus determined prescan reading condition. Therefore, the image reading method can prescan a film under the optimum reading condition automatically without requiring operator's attention. As a result, the frequency of the occurrence that it is needed to start all over the prescan again is extremely decreased, and, moreover, productivity is advantageously least decreased, even in the case that it is needed to start all over the prescan again.

21 Claims, 5 Drawing Sheets

IMAGE READING METHOD

BACKGROUND OF THE INVENTION

The present invention relates to an image reading method for performing prescan under the optimum reading conditions in a case where images recorded on a film are read by consecutively prescanning the images at low resolution and, then, consecutively fine scanning the images at high resolution.

Heretofore, the images recorded on photographic films such as negatives and reversals (hereinafter called as film) have been commonly printed on light-sensitive materials (photographic paper) by means of direct exposure in which the film image is projected onto the light-sensitive material to achieve its areal exposure.

A new technology has recently been introduced and this is a digital print system that relies upon digital exposure. Briefly, the image information recorded on a film is read photoelectrically, converted to digital data and subjected to various image processing operations to expose the light-sensitive material digitally. The digital print system operating on this principle has been commercialized as the digital print system.

The digital print system is basically composed of: an image reading apparatus such as a scanner that photoelectrically reads the image data recorded on an original such as a transparent original, a reflection original or the like; an image processing apparatus that subjects an inputted image data to various processing operations, as well as controls and administers operations of the digital print system as a whole; and an image recording apparatus including a printer that exposes the light-sensitive material digitally in accordance with the image data subjected to those image processing operations, a processor which performs development on the exposed light-sensitive material and the like.

In the digital print system, the scanner reads an original image. The read image data is converted to digital data from which image processing conditions (exposure conditions) are determined in the image processing apparatus for allowing the image data to be subjected to various image processing steps. In the printer, the light-sensitive material is scan exposed in accordance with the image data subjected to image processing operations to form a latent image thereon and sent to the processor where development processing as determined by the light-sensitive material are performed to produce a finished print (photograph) reproducing the image that was recorded on the film.

The digital print system is capable of shortening a exposure time and therefore performing a quick exposure and, in addition, storing the image information of the finished print in a recording medium such as a photomagnetic disc or the like, so that, for example, it is unnecessary to read the film again and it is possible to facilitate and expedite an extra printing operation and the like. Moreover, the system has several advantages such that the system is capable of performing freely image processing including image editions such as image composites, image splits and the like, and other image processing such as color/density adjustment and the like to output the finished print subjected to editing and image processing in a free manner in accordance with applications.

When the film is read by the scanner, the film is first prescanned with a default reading condition so as to read the images recorded on the film at low resolution; secondly, a fine scan reading condition and image processing conditions are determined based on the thus prescanned images; thirdly, the film is fine scanned by the thus determined fine scan reading conditions to read images recorded on the film at high resolution; and lastly, the thus read fine scanned images are subjected to image processing operations under the above-described image processing conditions.

In a case that densities of base films differ from each other manufacturer by manufacturer as well as product by product, the default reading conditions of the film at prescanning are required to control a stop-down value (F-number) of a variable diaphragm or storage time of an image sensor so as to maintain a light quantity to be less than that which saturates the image sensor, even when the light passed through the brightest part (the minimum density part) of the film, for example, a negative base (base film) in the case of the negative film, is inputted into the image sensor.

However, densities of base films greatly differ from each other manufacturer by manufacturer as well as product by product so that setting the light quantity for prescan based on the base film with a low density will bring about a light quantity shortage when images recorded on the base film with a high density are read whereas setting the light quantity based on the base film with a high density will be liable to saturate the image sensor when images recorded on the base film with a low density are read.

Having these features, the ordinary digital print system is arranged to display messages such as "film density is low.", if the image sensor is saturated when the film with a low density is prescanned. Accordingly, when such a warning message is displayed, an operator is required to reset the light quantity for prescan by a manual operation in accordance with film kind so as to prescan the film again. Such a manual operation is time- and labor-consuming to cause decrease of productivity.

SUMMARY OF THE INVENTION

In view of the above-described problems based on the prior art, the present invention has an object to provide an image reading method capable of prescanning a film under the optimum reading condition automatically without requiring operator's attention.

In order to achieve the stated object, the invention provides an image reading method for consecutively prescanning a film at low resolution and, then, consecutively fine scanning the film at high resolution to read a plurality of images recorded in respective frames of said film, comprising the steps of:

performing a first scan on a part of said film or said film as a whole under a first reading condition;

calculating a minimum density or density distribution information of said film;

judging necessity for a second scan under a second reading condition different from said first reading condition on the basis of the thus calculated minimum density or density distribution information of said film;

determining said second reading conditions based on said minimum density or density distribution information of said film at the same time of the judging step or in response to a result of the judging step; and performing prescan under said second reading condition when said judging step results in that said second scan is necessary.

It is preferable that said first reading condition is a default reading condition.

It is preferable that said determining step of said second reading condition is performed either at the same time of the judging step of the necessity for said second scan or only when the judging step results in that said second scan is necessary.

It is preferable that when the judging step results in that said second scan is not necessary, instead of performing the prescan under said second reading condition, scanning said film as a whole under said first reading condition substitutes said prescan.

It is preferable that when the judging step results in that said second scan is necessary, said prescan is performed such that said second scan is performed under said second reading condition on a part of said film or said film as a whole after said second reading condition are determined.

It is preferable when the judging step of the necessity for said second scan is made while said first scan is being performed and said judging step results in that said second scan is necessary, said prescan is performed such that said second scan is successively performed by changing said first reading condition to said second reading condition.

It is preferable that changing said first reading condition to said second reading condition is performed when a frame detection is performed frame by frame and a frame of interest is detected among frame.

It is preferable that when the judging step of the necessity for said second scan is made while said first scan is being performed and said judging step results in that said second scan is necessary, said prescan is performed such that said second scan is performed on all frames of said film under said second reading condition by changing said first reading condition to said second reading condition.

It is preferable that said first scan is performed from one end of said film along its length and wherein, after said first scan is completed, said second scan is performed from the other end of said film along its length.

It is preferable that said first scan is performed from one end of said film along its length and wherein said second scan is performed from one of two ends of said film which is reached earlier in time than the other one of the two ends to the other one.

It is preferable that a plurality of the second reading conditions are previously stored and then a reading condition with high frequency of occurrence among the plurality of the stored second reading conditions is utilized as said first reading condition.

The invention provides an image reading method for consecutively prescanning a film at low resolution and, then, consecutively fine scanning the film at high resolution to read a plurality of images recorded in respective frames of said film, comprising the steps of:

performing scan on said film under a first reading condition;

calculating a minimum density or density distribution information of said film;

determining a second reading condition based on the minimum density or density distribution information of said film; and performing prescan on said film under said second reading condition.

It is preferable that said first reading condition is a default reading condition.

It is preferable that judgement on necessary for the prescan is made based on the minimum density or density distribution information of said film and wherein, when the judgement results in that the prescan is not necessary, said second reading condition is substituted for said first reading condition.

It is preferable that said second reading condition is determined while said film is being scanned under said first reading condition and, thereafter, said film is prescanned under said second reading condition by changing said first reading conditions to said second reading condition.

It is preferable that changing said first reading condition to said second reading condition is performed when a frame detection is performed frame by frame and a frame of interest is detected among frames.

It is preferable that when said second reading condition is determined while said film is being scanned under said first reading condition, the prescan is performed on all frames of said film under said second reading condition.

It is preferable that the scan of said film under said first reading condition is performed from one end of said film along its length and wherein the prescan of said film under said second reading condition is performed from the other end of said film along its length.

It is preferable that the scan of said film under said first reading condition is performed from one end of said film along its length and wherein the prescan of said film under said second reading conditions is performed from one of two ends of said film which is reached earlier in time than the other one of the two ends.

It is preferable that a plurality of the second reading conditions are previously stored and then a reading condition with high frequency of occurrence among the plurality of the stored second reading conditions is utilized as said first reading condition.

DETAILED DESCRIPTION OF THE INVENTION

An image reading method of the invention will now be described in detail with reference to the preferred embodiments shown in the accompanying drawings.

Figure 1:
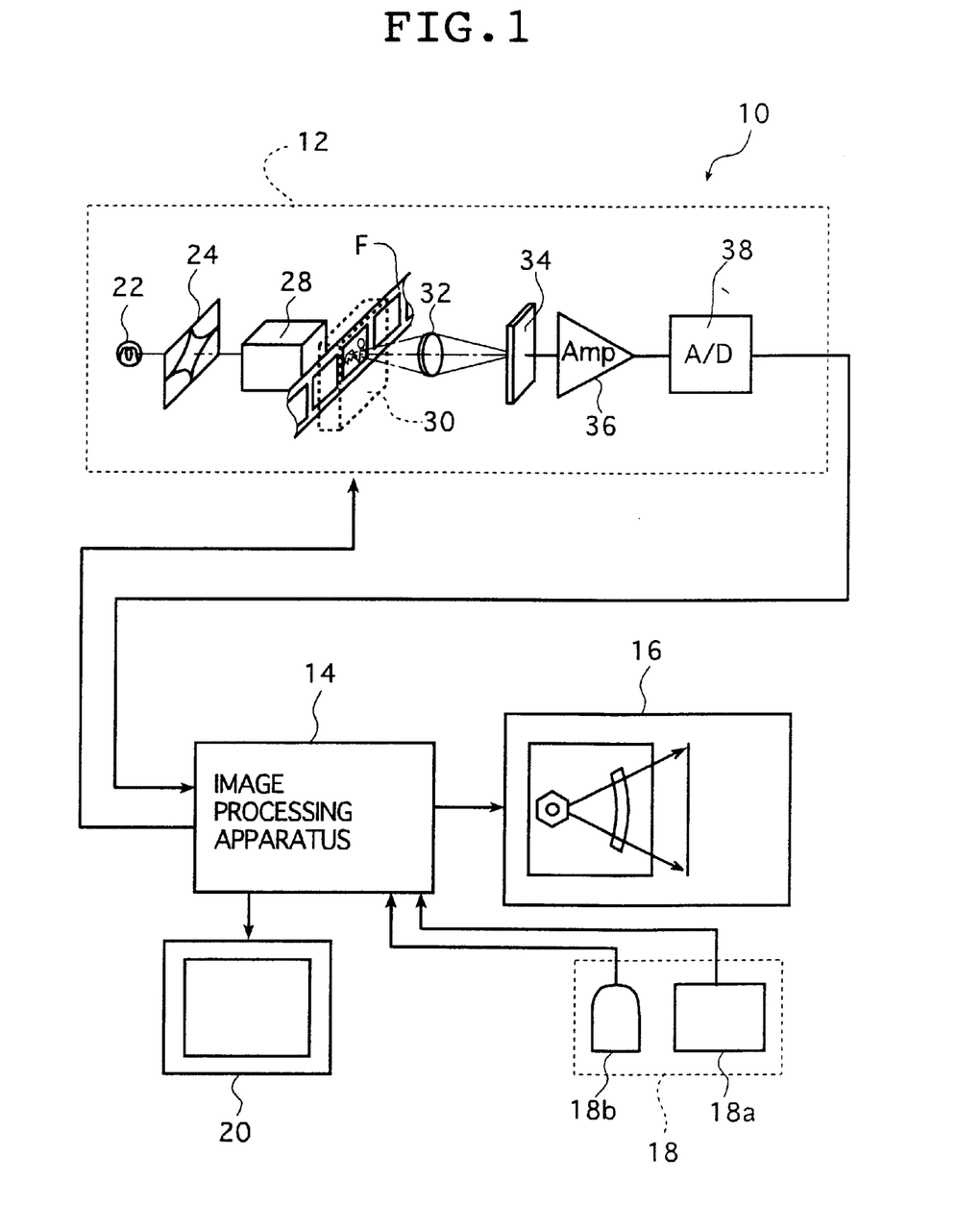
FIG. 1 is a conceptual view showing an embodiment of a digital print system applying the invention.

FIG. 1 is a conceptual view showing an embodiment of a digital print system applying the invention. The digital print system 10 shown in FIG. 1 basically comprises a scanner 12 (image reading apparatus) for consecutively reading a plurality of images recorded on a film F on a frame basis, an image processing apparatus 14 which performs image processing on the thus read image data and with which the print system 10 as a whole is controlled, and an image recording apparatus 16 which exposes a light-sensitive material in accordance with an image data subjected to image processing and which performs development processing.

In FIG. 1, shown are an inputting unit 18 having a keyboard 18a, a mouse 18b and the like for inputting (setting) various conditions, selecting and commanding a specific processing step and entering a command and so forth for effecting color/density correction, and a display 20 such as a CRT (cathode ray tube), an LCD (liquid crystal display) or the like for representing the image captured with the scanner 12 or the like, various manipulative commands and pictures for setting/registering various conditions. These inputting unit 18 and display 20 are connected to a control section (not shown) of the image processing apparatus 14.

In the digital print system 10, the illustrated scanner 12 comprises a light source 22, a variable diaphragm 24, a diffuser box 28 which diffuses reading light emitted from the light source 22 and incident on the film F so that it becomes uniform across the plane of the film F, an imaging lens unit 32, an image sensor 34 having three line CCD sensors capable of reading images corresponding to respective R (red), G (green) and B (blue), an amplifier (Amp) 36 and an A/D (analog/digital) converter 38.

Dedicated carriers 30 are available that can be loaded into the body of the scanner 12 in accordance with the type or the size of the film used (e.g. whether it is a film of the Advanced Photo system (APS) or a negative or reversal film of 135 size), the format of the film (e.g. whether it is a strip or a slide) or other factor. By replacing one carrier 30 with another, the scanner 12 can be adapted to process various kinds of films in various modes. The images (frames) that are recorded on the film F are transported to a specified reading position by means of the carriers 30.

Figure 2A:
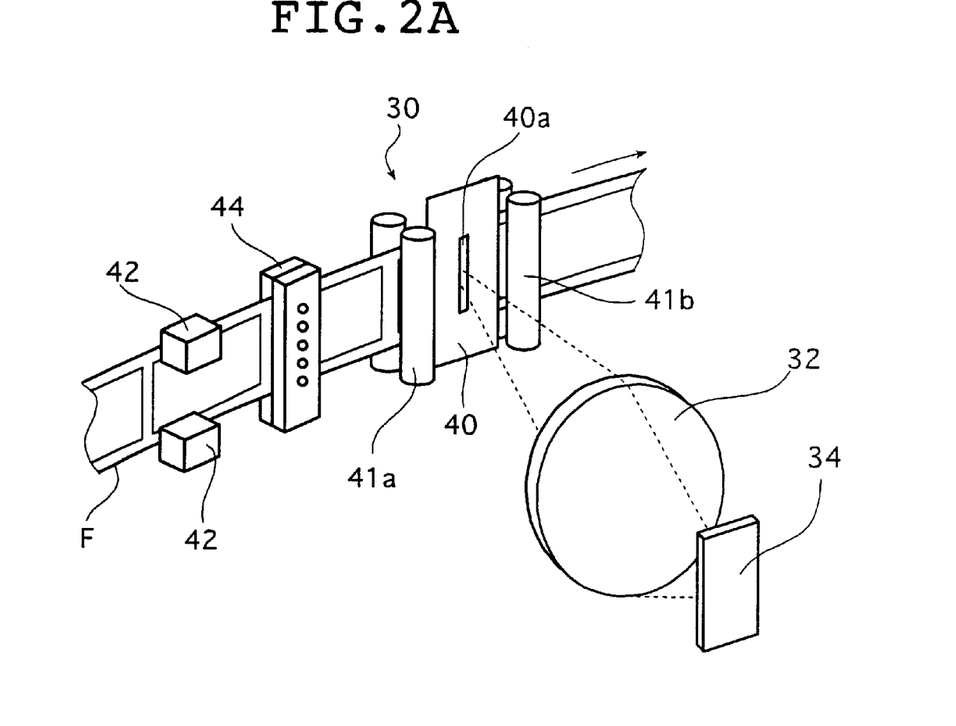
FIG. 2A is a schematic perspective view showing an embodiment of a carrier applying the digital print system shown in FIG. 1.

FIG. 2A is a schematic perspective view showing an embodiment of a carrier. The illustrated carrier 30 which is adapted to handle films F of APS extends basically in a fine scanning direction (width direction of the film F). The carrier 30 includes a mask 40 having a slit 40a which regulates the reading light incident on the film F and a pair of transport roller pair 41a and 41b which are provided on opposite sides of the mask 40 respectively in an auxiliary scanning direction (longitudinal direction of the film F) and which transport the film F in the auxiliary scanning direction while holding the film F in registry with the specified reading position.

Moreover, as shown in FIG. 2A, the carrier 30 is provided with two magnetic heads 42 and 42 which read information recorded on magnetic recording media formed on the APS film F and which also record necessary information.

Figure 3:
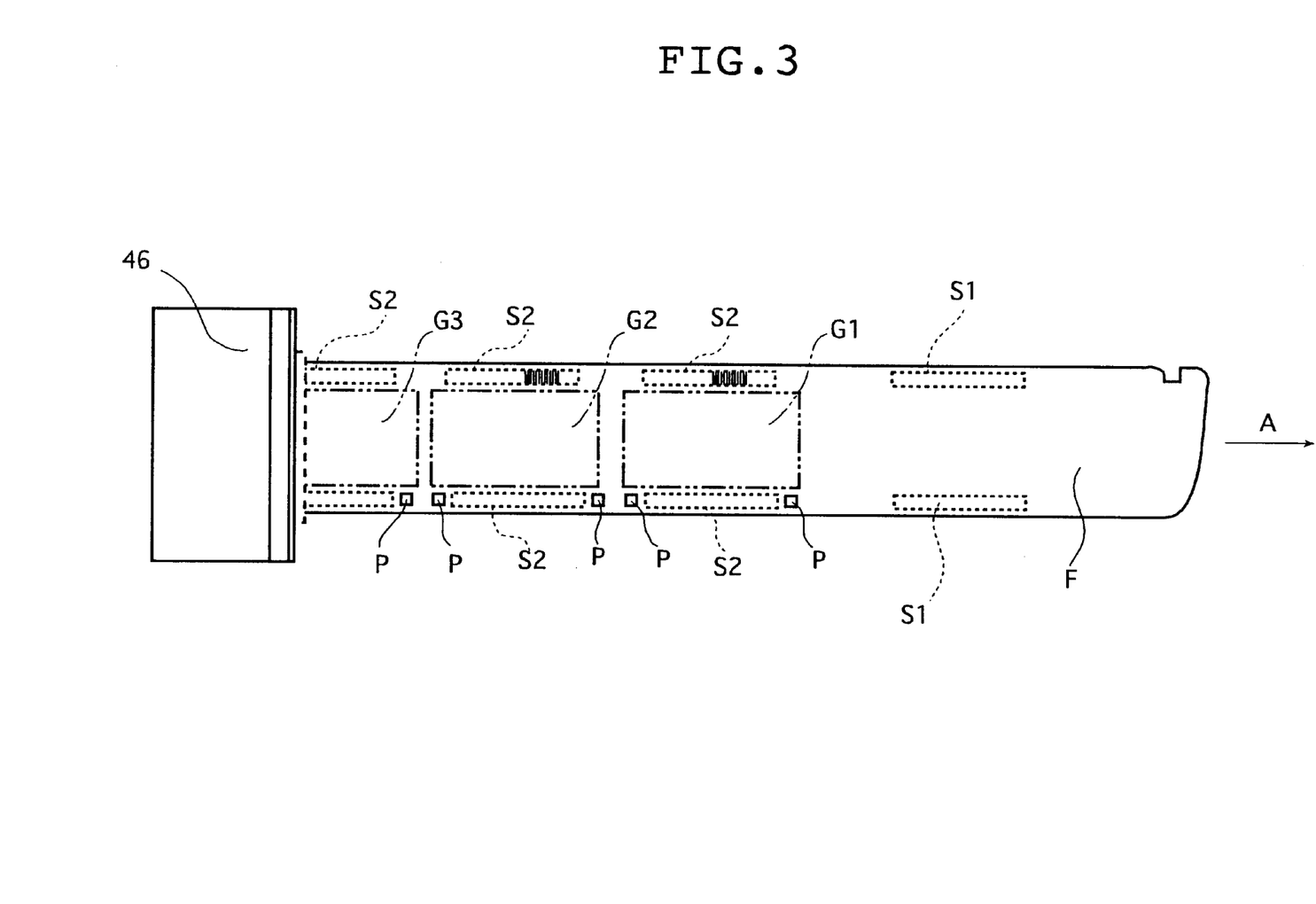
FIG. 3 is a schematic view showing an embodiment of an APS (Advanced Photo System) film.

FIG. 3 is a schematic view showing an embodiment of an APS (Advanced Photo System) film. As shown in FIG. 3, the APS film F has a transparent magnetic recording medium S formed on the following regions along its length (in the auxiliary scanning direction): a specified region downstream of the leading frame G1 in the direction in which the film F is unwound from the cartridge 46 (in the direction of arrow A), regions corresponding to respective frames G and a specified region upstream of the trailing frame (not shown), all being particularly near both edges of the film width (in the fine scanning direction).

Information about the film F taken as a whole such as cartridge Id, film type, sensitivity and development date are magnetically recorded in the magnetic recording media S1 near the leading (or trailing) end of the film F, and information at the time of taking a picture about each frame such as the date and time of taking the picture, the presence or absence of light emission from an electronic flash when the picture was taken, the title, the size of the frame used when the picture was taken and the like are recorded in the magnetic recording media S2 in the individual frame regions. In principle, camera-related information is recorded on one side of the width of the magnetic recording medium S whereas lab-related information is recorded on the other side.

The magnetic head 42 reads information recorded on the magnetic recording medium S2 in the frame of the film F which is provided for being read and then sends the thus read information to the image processing apparatus 14. Moreover, the above-described information are recorded in and read from the magnetic recording medium S of the film F by the camera, the developing apparatus of the film F, the carrier 30 or the like. Indicated by the reference symbol P in FIG. 3 is a perforation for assisting in transport (feeding and rewinding) of the film F, for example, when the picture is taken.

Conventional films of 135 size, as well as APS film, are provided with records of various bar codes such as DX code, expanded DX code, FNS code and the like for representing film type, sensitivity, frame number and other information. A code reader 44 for optically reading such bar codes is provided between the magnetic heads 42 and the mask 40 in the carrier 30. The code reader 44 is provided not only to the carrier 30 for APS but also to conventional film carriers.

Figure 2B:
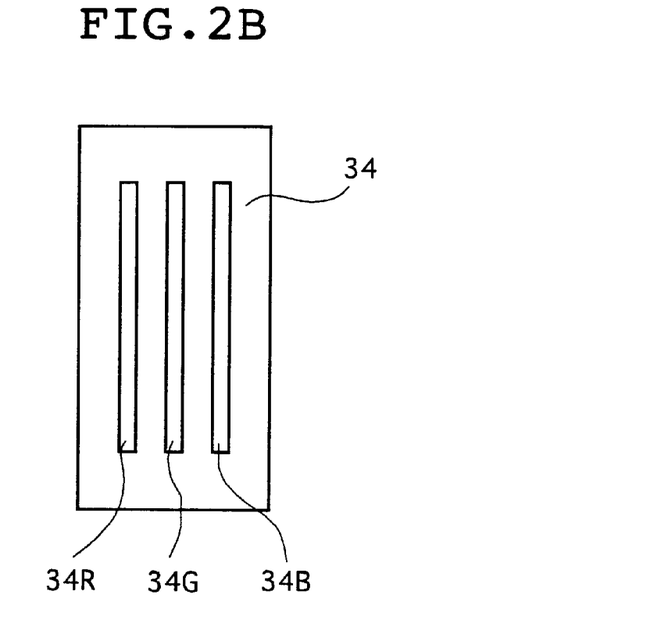
FIG. 2B is a schematic perspective view showing an embodiment of an image sensor applying the digital print system shown in FIG. 1.

FIG. 2B is a schematic perspective view showing an embodiment of an image sensor. The image sensor 34 in the present embodiment is a 3-line color CCD sensor comprising a line CCD sensor 34R for reading an R image, a line CCD sensor 34G for reading a G image, and a line CCD sensor 34B for reading a B image. Respective line CCD sensors extend in the fine scanning direction associated with the slit 40a of the mask 40. The projected light from the film F is separated into three primary colors R, G and B and then captured photoelectrically by means of the image sensor 34.

In the scanner 12, the reading light emitted from the light source 22 has its quantity adjusted by the variable diaphragm 24, is diffused uniformly across the plane of the film F by the diffuser box 28, passes through the slit 40a of the mask 40 in the carrier 30 and is incident on the film F which is transported in the auxiliary direction by the transport roller pairs 41a and 41b. As a result, the film F is slit scanned two-dimentionally by the slit 40a which extends in the fine scanning direction.

The reading light is allowed to pass through the film F, whereby the projected light bearing the image recorded on the film F is produced and then focused by the imaging lens 32 to form a sharp image on the light-receiving plane of the image sensor 34 where the projected light is separated into three primary colors R, G and B for being photoelectrically read. The image data read by the image data is amplified with the Amp 36, converted by the A/D converter 38 into digital signals and sent to the image processing apparatus 14.

As described above, a plurality of images recorded on the film F are consecutively read frame by frame by the scanner 12. In the image reading method of the invention, image reading is performed by preliminarily scanning the film F under a default reading condition and by two more subsequent scans: the first, prescan for consecutively reading images recorded on the film F at low resolution under a prescan reading condition; the second, the fine scan for consecutively reading images recorded on the film F at high resolution under a fine scan reading condition.

Figure 5:
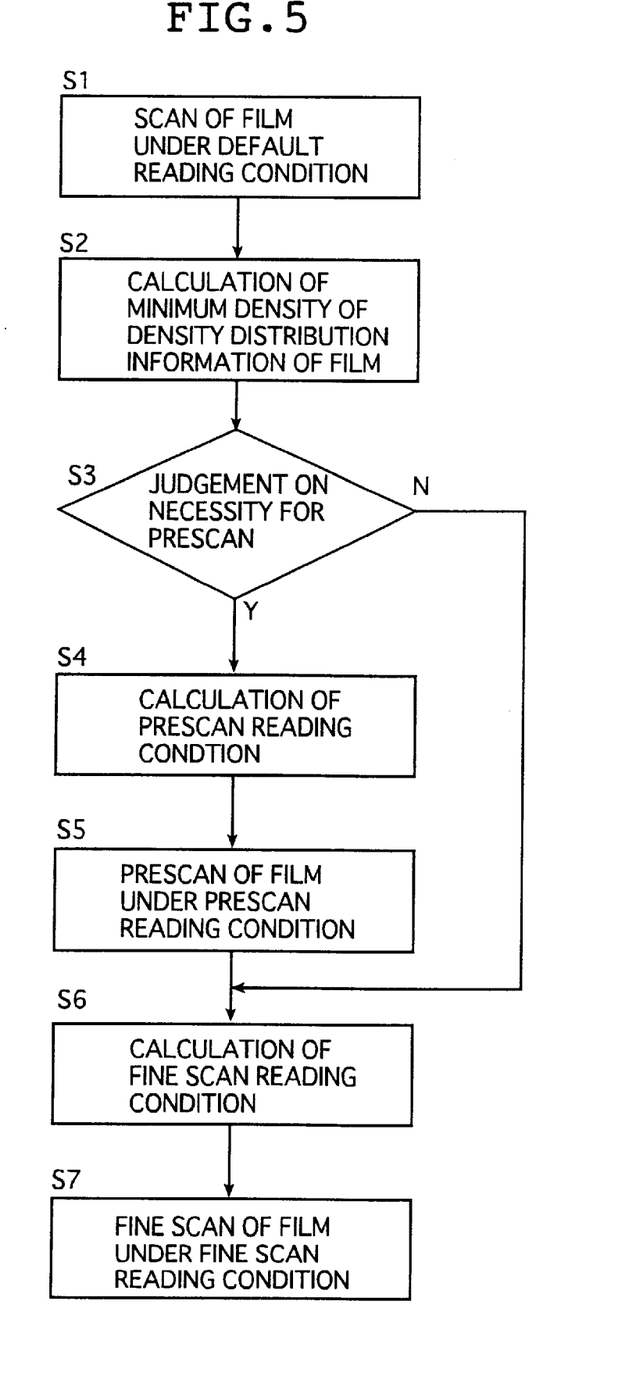
FIG. 5 is a flowchart showing respective steps in an embodiment of the image reading method of the invention.

The image reading method of the invention is now described in detail with reference to a flowchart shown in FIG. 5.

Image reading is performed by the following steps.

As a step Sl, the film F is scanned under the default reading condition, that is, reading condition with the light quantity which does not saturate the image sensor 34 at reading the images regardless of densities of base films which differ from each other in accordance with films. As a step S2, the minimum density or density distribution information of the film F which has been scanned is calculated. In this case, reading resolution of the scan under the default reading condition may be either same as or different from that of the prescan.

The minimum density on density distribution information of the film F is calculated in a setup subsection 72 of a condition setting section 60 which is described later. For example, they may be directly calculated by constructing a density histogram or the like from density data (information) of the scanned film F, or density information of base films corresponding to respective film kinds may preliminarily be stored, thereafter the information of the film kind recorded on the magnetic recording medium S of the APS film or on the bar codes of the conventional film of 135 size may be captured and the corresponding density information of the base film may be obtained from the thus captured film kind information.

As a step S3, whether prescan is performed or not is determined on the basis of the minimum density and density distribution information of the film F. The scan under the default reading condition is performed for determining the optimum reading condition for the prescan. If the reading condition of the prescan appears to be nearly same as the default reading condition, the prescan is not required whereupon the scan under the default reading condition can substitute the prescan.

In other words, when a judgement as to whether the prescan is performed or not is performed and as result, it is judged that the prescan is necessary ('Y' in the step S3 shown in FIG. 5), as a step S4, the reading condition of the prescan such as the stop-down value of the variable diaphragm 24, the storage time of the image sensor 34 and the like, is determined on the basis of the minimum density or density distribution information of the film F obtained by the scan under the default reading condition and, then, as a step S5, the film F is prescanned under the thus determined reading condition of the prescan.

As described above, the reading condition of the prescan is determined by scanning the film F under the default reading condition; hence, the film F with a base film of any density can be prescanned under the optimum reading condition automatically without requiring operator's attention. Accordingly, the frequency of the occurrence that it is needed to start all over the prescan again can extremely be decreased and, moreover, productivity is advantageously least decreased even in the case that it is needed to start all over the prescan again.

Judgement as to whether the prescan is performed or not is not necessarily required. It is allowed to proceed from the step S2 to the step S4 without executing this judgement. In this case, reading condition of the prescan is independently calculated and then the prescan may be performed under the thus calculated reading condition. However, if the judgement is executed, the aforementioned calculation of reading condition of prescan, as well as steps 4 and 5 of the prescan, may be omitted. If the above case is adopted, productivity will be increased.

It is preferable that the reading conditions of the prescan are preliminarily stored and then appropriate reading condition which may appear in high frequency of occurrence is selected from among the thus stored reading condition of the prescan for being utilized as the default reading condition at the time of reading the film F next time. This helps learning function work as the number of scanning several kinds of films is gradually increased whereby possibility of omitting prescan is increased with the number when judgement as to whether the prescan is performed or not is executed at the step S3.

The reading condition of the prescan may be determined while the film F is being scanned under the default reading condition at the step S1 or after the film F is scanned. Moreover, after the reading condition of the prescan is determined, the prescan of the film F may be performed under the thus determined reading condition of the prescan starting from a frame next to the last frame which is scanned under the default reading condition. Alternatively, all frames of the film F may be prescanned.

It is preferable from the standpoint of time efficiency that the scan under the default reading condition is performed from one end of the film along its length whereas the prescan is performed from the other end of the film along its length. It is also preferable that, if the reading condition of the prescan is determined while the film F is being scanned under the default reading condition, the prescan is performed from any one of two ends of the film F along its length which reached is earlier in time than the other one of the two ends of the film F.

Subsequently, as a step S6, based on the minimum density or density distribution information of the film F which have been obtained by the prescan or, when it is judged in the step S3 that the prescan is not necessary ('N' in the step S3 shown in FIG. 5), by the scan under the default reading condition, the reading condition of fine scan and image processing conditions in the image processing apparatus 14 are determined and, thereafter, as a step S7, the film F is fine scanned under the thus determined reading condition of the fine scan.

The image reading method of the invention is basically arranged as described above.

It should be noted that the scanner to be used in the print system 10 is by no means limited to a type that relies upon the slit scan technique described above but that it may be of a type that relies upon areal exposure, or a technique by which the image in one frame is scanned across at a time.

In this alternative approach, an area CCD sensor may be used with means of inserting R, G and B color filters between the light source and the film F. Image capturing with the area CCD sensor is performed with R, G and B color filters being sequentially inserted to color separate the image recorded on the film.

In the print system 10, the original image and its supply source is by no means limited to the scanner 12 which reads images on transparent originals such as various kinds of photographic film or the like and various substitutes may be mentioned, such as scanners reading reflection originals, for example, various kinds of photographic prints, printed matters and the like, imaging devices as exemplified by a digital still camera and a digital video camera, on-line communication systems such as the Internet and a local area network, and recording media (or means of writing information to or reading information from media) such as MO disks.

As already mentioned, the digital signals outputted from the scanner 12 are fed into the image processing apparatus (hereinafter called as processing apparatus) 14.

Figure 4:
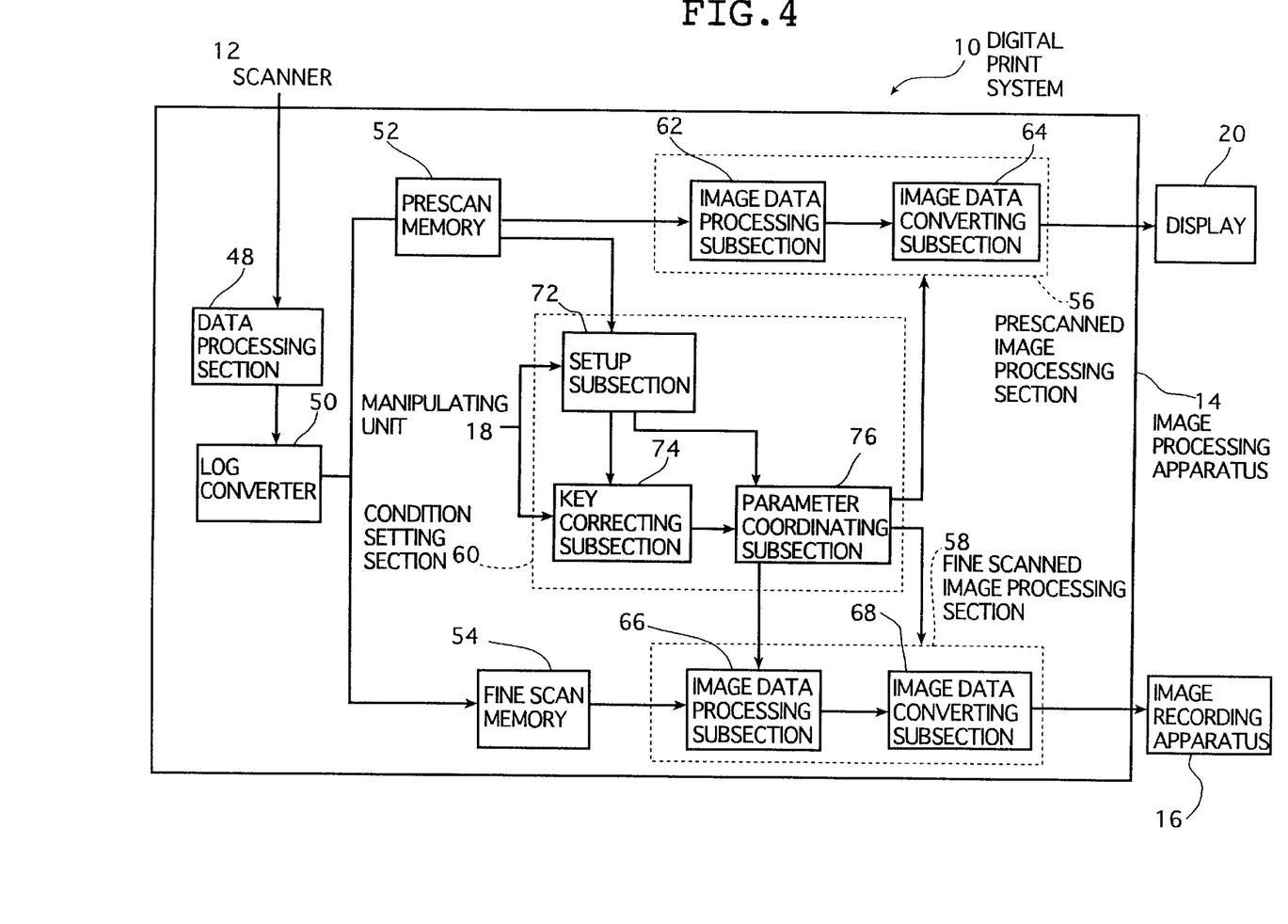
FIG. 4 is a block diagram showing an embodiment of an image processing apparatus applying the digital print system shown in FIG. 1.

FIG. 4 is a block diagram showing an embodiment of the processing apparatus 14, which comprises a data processing section 48, a log converter 50, a prescan (frame) memory 52, a fine scan (frame) memory 54, a prescanned image processing section 56, a fine scanned image processing section 58 and a condition setting section 60.

FIG. 4 shows only the sites related to image processing for the purpose of simplicity of description and besides these sites, the processing apparatus 14 includes a control section for controlling and administering the overall operation of the print system 10 including the processing apparatus 14 by way of an inputting unit 18 and a display 20 which are found in a personal computer or the like.

The respective R, G and B digital signals outputted from the scanner 12 are sent to the data processing section 48, where they are subjected to specified data processing steps such as dark correction, defective pixel correction and shading correction. Thereafter, the processed digital signals are transferred into the log converter 50, where they are converted to digital form (density data), of which the image data scanned under the default reading condition and prescanned are stored in the prescan memory 52 and those fine scanned are stored in the fine scan memory 54.

The image data stored in the prescan memory 52 is read into the condition setting section 60 and the prescanned image processing section 56 whereas the image data stored in the fine memory 54 is read into the fine scanned image processing section 58.

In the processing apparatus 14, the prescanned image processing section 56 comprises an image data processing subsection 62 and an image data converting subsection 64 whereas the fine scanned image processing section 58 comprises an image data processing subsection 66 and an image data converting subsection 68.

The processing subsection 62 in the prescanned image processing section 56 and the processing subsection 66 in the fine scanned image processing section 58 are the sites where the image (image data) captured with the scanner 12 is subjected to specified image processing steps in accordance with the conditions that are set by means of the condition setting section 60 which will be described later in this specification. The two processing subsections 62 and 66 perform basically the same processing except for resolution. Image processing in the two processing subsections 62 and 66 are not limited to any specific way and various known image processing are adaptable.

The image processing steps are exemplified by gray balance adjustment, tone (gradation) correction, density (lightness) adjustment and so forth which are each performed using LUTs (look-up tables), correction for the kind of light source used in taking the picture and saturation (color) adjustment of images which are each performed by matrix (MTX), and other processing steps such as electronic magnification, dodging (compressing/extending the dynamic range of the density) and sharpening (sharpness correction) which are each performed using any one of a low-pass filter, an adder, LUT, MTX and the like or using averaging processing, interpolation operations and the like that are brought about by appropriately combining the above mentioned devices such as the low-pass filter, the adder, LUT and MTX.

The image data converting subsection 64 optionally thins out the image data processed by the processing subsection 62 and converts the image data with a 3D-LUT or the like into image data that corresponds to the representation on the display 20 and which is subsequently represented on the display 20. Similarly, the image data converting subsection 68 is a site where the image data processed by the processing subsection 66 is converted with the 3D (three-dimensional) LUT or the like into image data that is subsequently supplied into the image recording apparatus 16 as image data corresponding to image recording with the image recording apparatus 16.

In the processing apparatus 14, the condition setting section 60 for setting various processing conditions in the prescanned image processing section 56 and the fine scanned image processing section 58 comprises a setup subsection 72, a key correcting subsection 74 and a parameter coordinating subsection 76.

In the condition setting section 60, the setup subsection 72 constructs density histograms of the film F based the image data obtained by scanning the film F under the default reading condition or calculates the minimum density or density distribution information of the film F based on the information on the density of base film which is so selected from among information preliminarily stored as to correspond to the information on the film kind recorded in the magnetic recording medium S of the APS film or in bar codes of the film of 135 size whereby the reading conditions for prescan is determined.

In the setup subsection 72, construction of density histograms of the film F and the calculation of image characteristic quantities of the film F such as average density, highlight (minimum density), shadow (maximum density) or the like are performed based on the image data obtained by prescanning the film F under the reading conditions of prescan, thereby determining the reading condition for fine scan. Moreover, the setup subsection 72, in response to commands optionally entered by the operator, constructs LUTs to be used for gray balance adjustment, density adjustment, tone correction or the like, constructs MTX operational formulae and calculates coefficients for sharpness correction thereby setting various image processing conditions in the prescanned image processing section 56 and the fine scanned image processing section 58.

The key correcting subsection 74 calculates the amounts of adjustment of image processing conditions in accordance with various commands entered from the inputting unit 18 by means of keys, the mouse 18b or the like for adjusting the density (brightness), color, contrast, sharpness, saturation and so forth that have been set in the keyboard 18a; the key correcting subsection 74 then supplies the calculated amounts of adjustment into the parameter coordinating subsection 76.

After receiving the image processing conditions that have been set by the setup subsection 72, the parameter coordinating subsection 76 sets them in the prescanned image processing section 56 and the fine scanned image processing section 58. Further, in accordance with the amounts of adjustment calculated by the key correcting subsection 74, the parameter coordinating subsection 76 either corrects (adjusts) the image processing conditions set in various parts or makes another setting of image processing conditions.

We now briefly describe the operations of the digital print system 10 adapted to the image recording method of the invention.

At a command for starting print preparation of film F, the film is scanned under the default reading conditions so that the image recorded on the film F is captured photoelectrically as R, G and B separations which are then converted into digital signals. These R, G and B digital signals outputted from the scanner 12 are fed into the processing apparatus 14 where these signals are subjected to the specified data processing, as well as to the log conversion, to produce density data which is then temporarily stored in the prescan memory 52.

Thereafter, the image data scanned under the default reading condition is read out from the prescan memory 52 to be supplied to each of the setup subsection 72 of the condition setting section 60 and the processing subsection 62 of the prescanned image processing section 56.

In the setup subsection 72, based on the image data obtained by scanning under the default reading condition, density histogram or the like is constructed to calculate the minimum density or the density distribution information of the film F and, thereafter, based on the calculated minimum density or the density distribution information of the film of interest, the prescan reading condition is determined. The image data obtained by scanning under the default reading condition is image processed at the processing subsection 62, converted at the image data converting subsection 64 into the image data suitable for representation and then represented on the display 20.

Subsequently, the prescan reading condition is set in the scanner 12 so that the prescan of the film F starts under the thus set prescan reading condition. The prescanned image data is temporarily stored in the prescan memory 52 in the same manner as with the image data scanned under the default reading condition. Thereafter, the prescanned image data is read from the prescan memory 52, sent to each of the setup subsection 72 of the condition setting section 60 and the processing. subsection 62 of the prescanned image processing section 56.

In the setup subsection 72, the construction of density histograms, the calculation of image characteristic quantities and the like are executed for setting the fine scan reading condition and, thereafter, image processing conditions (light exposure conditions) in respective processing subsections 62 and 66 are determined in accordance with the thus constructed density histograms and the calculated image characteristic quantities, and in response to commands optionally entered by the operator whereby the thus determined image processing conditions are sent to the parameter coordinating subsection 76. The parameter coordinating subsection 76 sets these image processing conditions in each of the prescanned image processing section 56 and the fine scanned image data processing section 58.

The operator's verification is optionally performed. The prescanned image data is image processed in the processing subsection 62, converted in the image data converting subsection 64 into the image data suitable for representation and, then, represented on the display 20 as a simulation image. Looking at the representation on the display 20, the operator checks (verifies) the image, or the result of the processing and, if necessary, manipulates the aforementioned keys on the keyboard 18a or the mouse 18b to adjust the color, density, tone (gradation) and other features of the image.

The inputs for this adjustment are provided to the key correcting subsection 74 which, in response to the entered inputs for adjustment, calculates the amounts of correction of the image processing conditions and sends them to the parameter coordinating subsection 76. In response to the supplied amounts of correction from the key correcting subsection 74, the parameter coordinating subsection 76 corrects the LUTs, MTXs and other conditions in the processing subsections 62 and 66 as already described above. The image represented on the display 20 also varies in response to this corrective measure, or the inputs for adjustment entered by the operator.

If the operator concludes that the image in the frame of interest represented on the display is appropriate (verification OK), the operator manipulates the keyboard 18a or the mouse 18b to issue a command for print start, whereupon the image processing conditions are finalized and set in the scanner 12 in accordance with the reading conditions for the fine scan, and then the fine scan starts.

If no image verification is to be performed, the image processing conditions are finalized at the point of time when the parameter coordinating subsection 76 ends setting of the image processing conditions in the fine scanned image processing section 58, and then the fine scan starts.

Fine scan is performed under the fine scan reading condition. The image data obtained by the fine scan is temporarily stored in the fine scan memory 54. Thereafter, the fine scan image data is read from the fine scan memory 54 to be sent to the processing subsection 66 of the fine scanned image processing section 58 where the fine scan image data is subjected to various image processing under the specified image processing conditions, and subsequently converted to output image data in the image data converting subsection 68 before it is sent to the image recording apparatus 16.

The image recording apparatus 16 is essentially composed of a printer (exposing device) that records a latent image on a light-sensitive material (photographic paper) by exposing it in accordance with the supplied image data and a processor (developing device) that performs specified processing steps on the exposed light-sensitive material and which outputs it as a print.

To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the fine scanning direction while, at the same time, the light-sensitive material is transported in the auxiliary scanning direction perpendicular to the fine scanning direction so as to record a latent image by two-dimensional scan exposure with said light beams; and the thus recorded latent image bearing light-sensitive material is supplied to the processor.

Receiving the light-sensitive material, the processor performs a wet development process comprising color development, bleach-fixing and rinsing; the thus processed light-sensitive material is dried to produce a finished print; a plurality of prints thus produced are sorted and stacked in specified units, say, one roll of film.

While the image reading method of the present invention has been described above in detail, it should be noted that the invention is by no means limited to the foregoing embodiments and various improvements and modifications may of course be made without departing from the scope and spirit of the invention.

As described above in detail, the image reading method of the present invention basically performs the steps below: scanning the film under the default reading condition; calculating the minimum density or density distribution information of the film; determining the prescan reading condition based on the thus calculated minimum density or density distribution information of the film; and prescanning the film under the thus determined prescan reading condition.

According to the image reading method of the invention, the prescan reading condition is to be determined by scanning the film under the default reading condition so that the film with a base film of any density can be prescanned under the optimum reading condition automatically without requiring operator's attention. Therefore, the frequency of the occurrence that it is needed to start all over the prescan again can extremely be decreased and, moreover, productivity is advantageously least decreased, even in the case that it is needed to start all over the prescan again.

What is claimed is:

1. An image reading method for consecutively prescanning a film at low resolution and, then, consecutively fine scanning the film at high resolution to read a plurality of images recorded in respective frames of said film, comprising the steps of:

performing a first scan on a part of said film or said film as a whole under a first reading condition;

calculating a minimum density or density distribution information of said film;

judging necessity for a second scan under a second reading condition different from said first reading conditions on the basis of the thus calculated minimum density or density distribution information of said film;

determining said second reading conditions based on said minimum density or density distribution information of said film at the same time of the judging step or in response to a result of the judging step; and performing prescan under said second reading condition when said judging step results in that said second scan is necessary.

2. The image reading method according to claim 1, wherein said first reading condition is a default reading condition.

3. The image reading method according to claim 1, wherein said determining step of said second reading condition is performed either at the same time of the judging step of the necessity for said second scan or only when the judging step results in that said second scan is necessary.

4. The image reading method according to claim 1, wherein, when the judging step results in that said second scan is not necessary, instead of performing the prescan under said second reading condition, scanning said film as a whole under said first reading condition substitutes said prescan.

5. The image reading method according to claim 1, wherein, when the judging step results in that said second scan is necessary, said prescan is performed such that said second scan is performed under said second reading condition on a part of said film or said film as a whole after said second reading condition are determined.

6. The image recording method according to claim 1, wherein, when the judging step of the on necessity for said second scan is made while said first scan is being performed and said judging step results in that said second scan is necessary, said prescan is performed such that said second scan is successively performed by changing said first reading condition to said second reading condition.

7. The image reading method according to claim 6, wherein changing said first reading condition to said second reading conditions is performed when a frame detection is performed frame by frame and a frame of interest is detected among frame.

8. The image reading method according to claim 1, wherein, when the judging step of the necessity for said second scan is made while said first scan is being performed and said judging step results in that said second scan is necessary, said prescan is performed such that said second scan is performed on all frames of said film under said second reading condition by changing said first reading condition to said second reading condition.

9. The image reading method according to claim 8, wherein said first scan is performed from one end of said film along its length and wherein, after said first scan is completed, said second scan is performed from the other end of said film along its length.

10. The image reading method according to claim 8, wherein said first scan is performed from one end of said film along its length and wherein said second scan is performed from one of two ends of said film which is reached earlier in time than the other one of the two ends to the other one.

11. The image reading method according to claim 1, wherein a plurality of the second reading conditions are previously stored and then a reading condition with high frequency of occurrence among the plurality of the stored second reading conditions is utilized as said first reading condition.

12. An image reading method for consecutively prescanning a film at low resolution and, then, consecutively fine scanning the film at high resolution to read a plurality of images recorded in respective frames of said film, comprising the steps of:

performing scan on said film under a first reading condition;

calculating a minimum density or density distribution information of said film;

determining a second reading condition based on the minimum density or density distribution information of said film; and performing prescan on said film under said second reading condition.

13. The image reading method according to claim 12, wherein said first reading condition is a default reading condition.

14. The image reading method according to claim 12, wherein judgement on necessary for the prescan is made based on the minimum density or density distribution information of said film and wherein, when the judgement results in that the prescan is not necessary, said second reading condition is substituted for said first reading condition.

15. The image reading method according to claim 12, wherein said second reading condition is determined while said film is being scanned under said first reading condition and, thereafter, said film is prescanned under said second reading condition by changing said first reading condition to said second reading condition.

16. The image reading method according to claim 15, wherein changing said first reading condition to said second reading condition is performed when a frame detection is performed frame by frame and a frame of interest is detected among frame.

17. The image reading method according to claim 12, wherein, when said second reading condition is determined while said film is being scanned under said first reading condition, the prescan is performed on all frames of said film under said second reading condition.

18. The image reading method according to claim 17, wherein the scan of said film under said first reading condition is performed from one end of said film along its length and wherein the prescan of said film under said second reading condition is performed from the other end of said film along its length.

19. The image reading method according to claim 17, wherein the scan of said film under said first reading condition is performed from one end of said film along its length and wherein the prescan of said film under said second reading conditions is performed from one of two ends of said film which is reached earlier in time than the other one of the two ends.

20. The image reading method according to claim 12, wherein a plurality of the second reading conditions are previously stored and then a reading condition with high frequency of occurrence among the plurality of the stored second reading conditions is utilized as said first reading condition.

21. The method of claim 12, wherein determining the second reading condition is determined from said minimum density or density distribution for automatically performing the prescan under the second reading condition.

* * * * *